United States Patent [19]
Roberts

[11] Patent Number: 5,295,774
[45] Date of Patent: Mar. 22, 1994

[54] SCREW AND METHOD OF MAKING SAME

[75] Inventor: David Roberts, Melbourne, Australia

[73] Assignee: W. A. Deutsher Pty. Ltd., Moorabbin, Australia

[21] Appl. No.: 938,580

[22] Filed: Sep. 2, 1992

Related U.S. Application Data

[63] Continuation of Ser. No. 641,955, Jan. 16, 1991, abandoned.

[30] Foreign Application Priority Data

Jan. 16, 1990 [AU] Australia .................... PJ8215

[51] Int. Cl.⁵ ............................................ F16B 25/00
[52] U.S. Cl. .................................. 411/387; 411/411; 411/914
[58] Field of Search ............... 411/387, 914, 386, 411, 411/415, 378, 399, 901, 902, 903, 904

[56] References Cited

U.S. PATENT DOCUMENTS

| | | | |
|---|---|---|---|
| 3,355,205 | 11/1967 | Wagner et al. | 411/903 |
| 3,478,639 | 11/1969 | Gruca | 411/415 X |
| 3,827,331 | 8/1974 | Muenchinger | 411/387 |
| 3,869,219 | 3/1975 | Wilson et al. | 411/387 X |
| 4,091,173 | 5/1978 | Hage | 411/914 X |
| 4,157,674 | 6/1979 | Carlson et al. | 411/901 X |
| 4,653,244 | 3/1987 | Farrell | 411/399 X |
| 4,730,970 | 3/1988 | Hyner et al. | 411/914 X |
| 4,797,022 | 1/1989 | Crigger | 411/399 X |
| 4,802,807 | 2/1989 | Offenburger et al. | 411/914 X |
| 5,015,134 | 5/1991 | Gotoh | 411/386 |

FOREIGN PATENT DOCUMENTS

| | | | |
|---|---|---|---|
| 2611395 | 7/1977 | Fed. Rep. of Germany | 411/387 |
| 476783 | 12/1937 | United Kingdom . | |
| 780901 | 8/1957 | United Kingdom . | |
| 1277044 | 6/1972 | United Kingdom . | |
| 1346786 | 2/1974 | United Kingdom . | |
| 1385139 | 2/1975 | United Kingdom . | |
| 2159745 | 12/1985 | United Kingdom | 411/387 |

Primary Examiner—Rodney M. Lindsey
Attorney, Agent, or Firm—Schwartz & Weinrieb

[57] ABSTRACT

A screw of the self-drilling and self-tapping kind intended to be used in fastening corrugated or similar cladding to a support structure is disclosed. The screw shank is provided with a feature, such as, for example, a circumferential series of axially extending ribs, which is operable to enlarge (such as, for example, by means of a reaming process) a hole formed through the cladding by means of the drilling tip of the screw. The hole enlarging feature is positioned at or adjacent to the junction defined between a threaded section of the shank and a non-threaded section which extends from the screw head. The hole enlarging feature is arranged so as to ensure that the aforementioned hole, as enlarged, has a diameter which is not less than that of the non-threaded section of the shank. There is also disclosed a method of forming such a screw in which the thread is formed by means of a thread rolling operation, and the thread rolling die is modified so as to automatically produce the hole enlarging feature upon the screw shank during the course of the thread rolling operation.

5 Claims, 2 Drawing Sheets

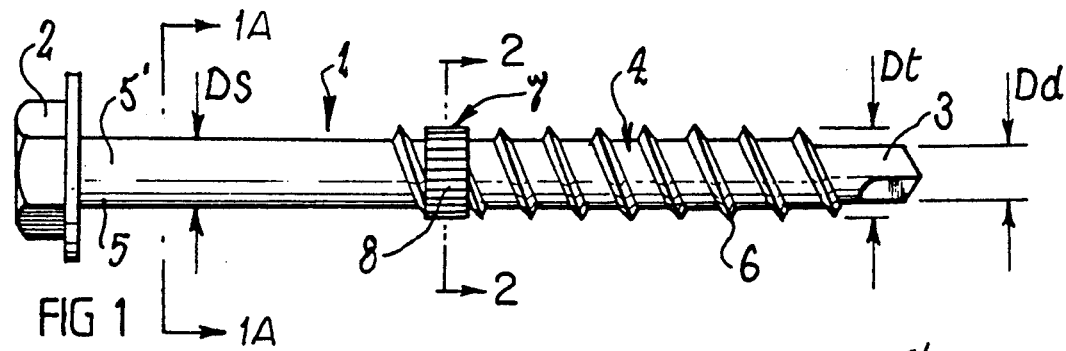
FIG 1
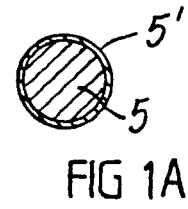
FIG 1A
FIG 2
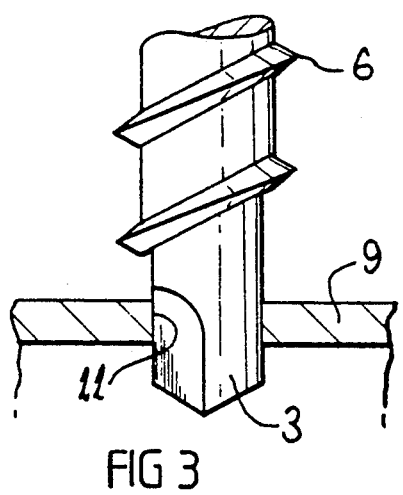
FIG 3
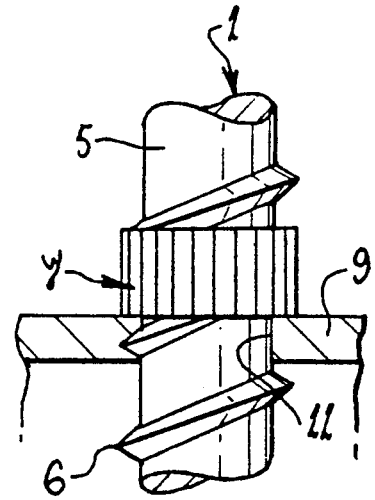
FIG 4
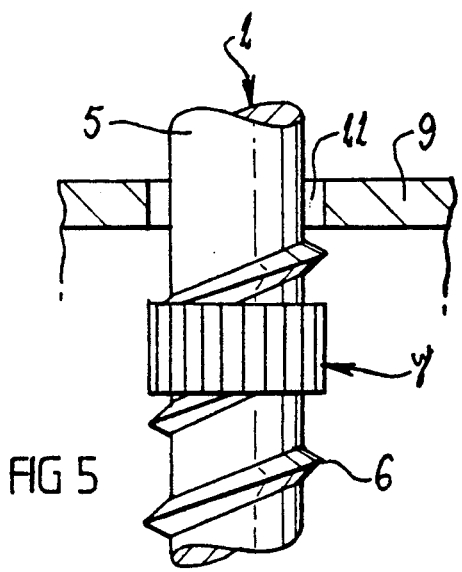
FIG 5

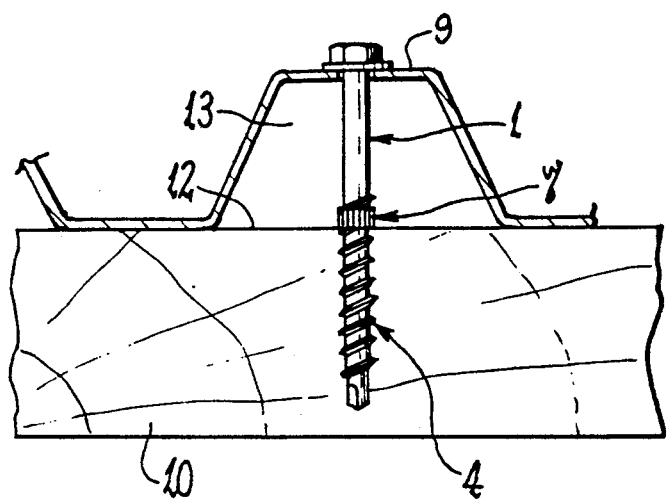
FIG 6
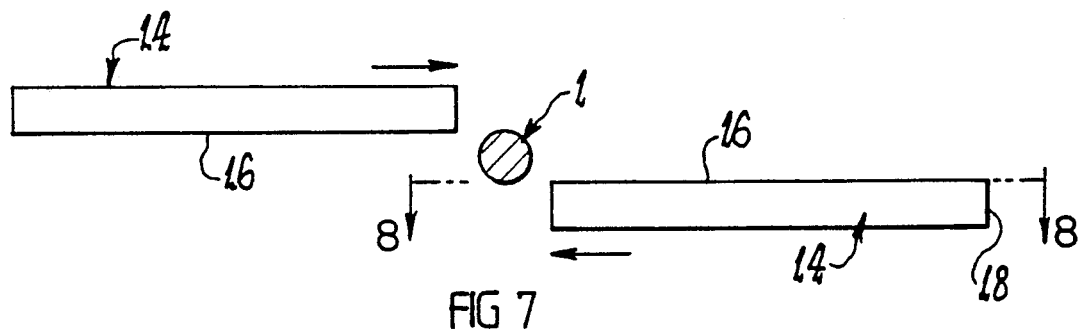
FIG 7
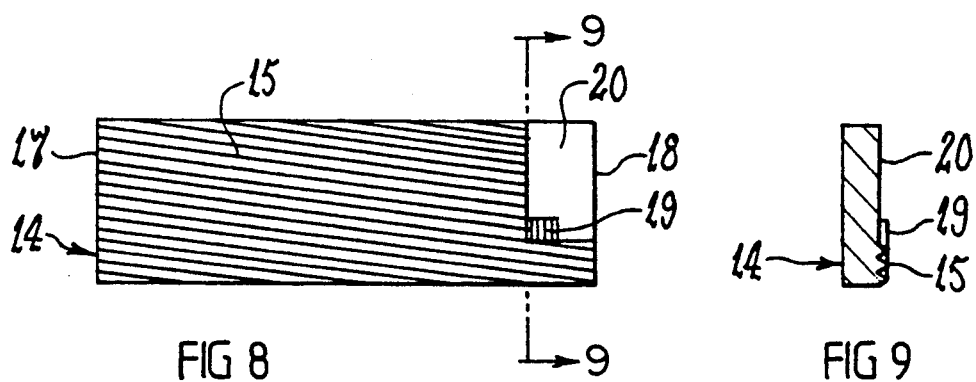
FIG 8
FIG 9

SCREW AND METHOD OF MAKING SAME

This application is a continuation of application Ser. No. 641,955, filed Jan. 16, 1991 now abandoned.

FIELD OF THE INVENTION

This invention relates to screws of the self-drilling and self-tapping kind. Such screws are well known and have a variety of applications. It is a feature of such screws that they have a drilling tip which is operable to form a hole within a support member, and a threaded section which is able to form a co-operating complementary thread within the sidewall portions of the support member which define the hole.

BACKGROUND OF THE INVENTION

One use of self-drilling screws is to secure metal cladding to roof and wall structures. Such cladding is commonly of a corrugated or similar form in cross-section so as to have a plurality of alternating ridges and valleys. The crest of each ridge, and the base of each valley, may be curved or flat. Metal cladding of such kind may be secured to an underlying frame of metal or timber.

When a self-drilling screw is used to secure such metal cladding to a frame, it is generally arranged with its head bearing against the crest of a ridge of the cladding while the threaded end section of the screw is engaged within the underlying frame member. A section of the screw shank, which is not screw threaded, extends between the cladding ridge and the frame member. When installing the screw, the drill tip of the screw cuts a hole through the cladding so as to permit passage of the screw to the underlying frame member, and the drill tip subsequently serves to cut a hole within the frame member. The threaded section of the screw then forms a co-operating complementary thread within the sidewall portions of the frame member which define the hole and the screw is thereby fastened to the frame member.

A problem arises when the screw is to be used under high load situations or conditions and particularly in those situation which require the screw to have substantial resistance to corrosion. An example of such a situation is where the screw is used to fasten roof cladding to an underlying frame structure or member within a high wind region having a corrosive environment—such as, for example, a region located close to saltwater. In such cases, the corrosion resistance factor is generally created by providing the screw with a suitable coating —such as, for example, by galvanizing, electroplating, mechanical platting, or by means of the application of a barrier coating system. The integrity of any such coating is important with respect to the ability of the screw to resist corrosion.

It is quite common in screws of the foregoinq kind for the non-threaded shank section to have a diameter which is greater than that of the hole formed by means of the drill tip. Thus, when the screw is being installed, the shank needs to be forced through the hole defined within the cladding, and that tends to cause removal of the protective coating from portions of the screw shank. It will often be the case that such portions of the shank will remain exposed between the cladding and the frame member when the screw is finally fastened in position, and consequently will be subjected or exposed to the corrosive environment.

Such partial destruction of the protective coating can have serious consequences, and will not be readily observable in many cases. That is, there may be no knowledge or forewarning of the loss of the corrosion resistance until the screw fails under load conditions due to corrosion occurring at the damaged regions.

OBJECT OF THE INVENTION

It is an object of the present invention to provide an improved self-drilling screw which overcomes or at least minimizes the foregoing problem. It is a further object of the invention to provide a method of forming such a screw.

SUMMARY OF THE INVENTION

A screw according to the present invention is characterized in that it incorporates a feature which is operative during installation of the screw to enlarge the hole formed by means of the drill tip. In a preferred form of the screw, such enlarging feature is located in an axially spaced relationship with respect to both the drill tip and the screw head. Ideally, the feature is located within the threaded section of the shank at or adjacent to the junction defined between the threaded section and the non-threaded shank portion of the screw.

The enlarging feature may have any suitable form. In one particular embodiment of the invention it is composed of a series of ribs which extends around the circumference of the screw. These ribs are provided upon a section of the screw which can be of any appropriate length, but it is generally unnecessary for that section to be substantially longer than the axial length of the drill tip. The crest diameter of the ribbed section is greater than, or at least equal to, the diameter of the non-threaded shank section of the screw.

A method according to the invention involves forming the threaded portion of the screw by means of a thread rolling technique, and providing the rolling dies with means whereby the hole enlarging feature as referred to above is automatically formed upon the screw towards the end of the thread forming operation. This method will be further explained in the following description of one particular form of screw which incorporates an embodiment of the invention.

Embodiments of the invention are described in detail in the following passages of the specification which refer to the accompanying drawings. The drawings, however, are merely illustrative of how the invention might be put into effect, so that the specific form and arrangement of the various features of the invention as shown is not to be understood as limiting with respect to the invention.

BRIEF DESCRIPTION OF THE DRAWINGS

Various other objects, features, and attendant advantages of the present invention will become better understood from the following detailed description when considered in connection with the accompanying drawings, in which like reference characters designated like or corresponding parts throughout the several views, and wherein:

FIG. 1 is a side elevation view of a typical screw to which an embodiment of the present invention has been applied.

FIG. 1A is a cross-sectional view of the screw of FIG. 1 taken along the line 1A—1A of FIG. 1.

FIG. 2 is an enlarged transverse cross-sectional view taken along line 2—2 of FIG. 1.

FIG. 3 is a view of the drilling tip portion of the screw, shown on an enlarged scale of FIG. 1, and shown penetrating a portion of cladding.

FIG. 4 is a view similar to that of FIG. 3 but showing the screw projected axially through the cladding to such an extent that the threaded portion of the screw is disposed within the sidewall portion of the cladding.

FIG. 5 is a view similar to that of FIG. 4 but showing the axial projection of the screw at a further stage at which the hole enlarging feature of the screw has already projected through the cladding wall.

FIG. 6 is a cross-sectional view showing a screw according to FIG. 1, securing typical cladding to a support structure.

FIG. 7 is a diagrammatic view of a pair of thread rolling dies as may be used to form the threaded section upon the screw of FIG. 1.

FIG. 8 is a view of one of the thread rolling dies taken along line 8—8 of FIG. 7.

FIG. 9 is a transverse cross-sectional view of the die of FIG. 8 taken along line 9—9 of FIG. 8.

DETAILED DESCRIPTION OF THE ILLUSTRATED EMBODIMENTS

FIG. 1 of the drawings shows an example of a self-drilling and self-tapping screw to which an embodiment of the present invention has been applied. The screw includes an elongate shank 1 and a head 2 at one end of the shank 1. The tip end of the shank 1 is formed in a known manner so as to provide a drilling tip 3, and a threaded section 4 is formed upon the shank 1 at an axial position adjacent to the drilling tip 3. A plain non-threaded section 5 of the shank extends between the head 2 and the threaded section 4.

It is common practice to form the thread 6 upon the section 4 by means of a thread rolling process, but other thread forming techniques could be employed. In accordance with a typical screw of the kind shown, the diameter Ds of the plain section 5 is greater than the maximum diameter Dd of the drilling tip 3 and is less than the crest diameter Dt of the threaded portion 6. As a consequence, the diameter Ds is greater than the root diameter of a thread formed by means of the threaded section 4 within a sidewall portion of a hole cut by the drill tip 3. It is generally unacceptable to enlarge the diameter Dd so as to bring it closer to the diameter Ds because that would reduce the depth of the thread formed within the sidewall of the aforementioned hole and thereby reduce the holding power of the screw.

The screw shown has been modified in accordance with the present invention by means of the addition of a hole enlarging feature 7 located at or adjacent to the junction of the shank sections 4 and 5. Another location may be chosen for the feature 7 but it is generally found that best results occur with the feature 7 located at or adjacent to the location shown in FIG. 1.

In the particular example shown, the feature 7 is formed by means of a series of ribs 8 (FIG. 2), each of which extends generally in the longitudinal direction of the shank 1. The series of ribs 8 extends completely around the circumference of the shank 1 and has an outer diameter Dr which is greater than, or at least equal to, the diameter Ds of the shank plain section 5. It will be appreciated that the feature 7 may have a form different than that shown in FIGS. 1 and 2.

When a screw as shown is used to fasten cladding 9 to a support member 10 (FIG. 6), the drilling tip 3 first forms a hole 11 of diameter Dd within the cladding 9 as shown in FIG. 3. As the screw is moved axially towards the member 10, the threaded section 4 operates to form a thread within the sidewall portions of cladding 9 which define the hole 11 (FIG. 4), but such thread has no purpose in the final assembly. After the section 4 has completed, or substantially completed, its passage through the hole 11, the ribs 8 function to enlarge the hole 11 as shown in FIG. 5. This enlargement results from a reaming-type action performed by means of the ribs 8, and enables the shank plain section 5 to pass through the cladding 9 with a clearance defined therebetween, or at least without such interference as to damage, or substantially damage, the corrosion resistance capacity of the screw.

It follows that any protective coating 5' of the plain section 5 will not be damaged, at least not substantially, as the screw is projected through the cladding 9 in order to achieve the final fastening condition as shown in FIG. 6. It is preferred, as shown at FIG. 6, that the enlarging feature 7 is positioned at or adjacent to the upper surface 12 of the support member 10. Ideally, the feature 7 is positioned close to the surface 12 so that at least the major part of the screw which is exposed to the space 13 defined between the member 10 and the cladding 9, is the shank plain section 5. It is relevant in that regard that the protective coating 5' formed upon the section 5 has not been damaged, and consequently the screw is unlikely to suffer substantial deterioration by means of corrosion over a period of time. The support member 10 may be made of any suitable material, such as, for example metal and timber. If it is made of timber, the feature 7 may be positioned below the surface 12, but such an arrangement is unlikely if the member 10 is made of steel.

As previously stated, it is preferred to form the thread 6 by means of a rolling method. FIG. 7 shows, in diagrammatic form, the screw shank 1 arranged so as to be acted upon by means of thread rolling dies 14. Each die 14 has a series 15 of threaded forming grooves provided within the surface 16 (FIG. 7) which is presented to the shank 1 during the thread forming operation. The two dies 14 are moved in opposite directions as shown by means of the arrows in FIG. 7 so as to subject the shank 1 to their inculdence and thereby form the thread 6 thereon. In this regard, each die 14 has a leading end 17 and a trailing end 18.

Each die 14 is modified in accordance with one aspect of the present invention so that the enlarging feature 7 is automatically formed during the thread rolling operation. In the embodiment shown within the drawings, each die 14 is modified by providing a series 19 of alternating ridges and valleys in the surface 16 at a location adjacent to the die trailing end 18. Each ridge of the series 19 extends transversely with respect to the direction of movement of the die 14, and the series 19 is located at such a position as to produce the ribs 8 within the shank 1 at the desired location along the shank.

Each die 14 is further modified by providing an undercut zone 20 behind and to one side of the series 19 so that there is no further disturbance of the shank 1 by means of the die 14 after the series 19 has passed over the shank 1.

It will be apparent that the enlarging feature 7 can be formed by methods other than that described above, but the described method has the advantage of simplicity and economy of cost. In particular, the screw is endowed with the feature of the present invention without being subjected to an operation which is additional to those performed for producing screws not incorporating the feature of the present invention.

Various alterations, modifications and/or additions may be introduced into the construction and arrangements of parts previously described without departing from the spirit or ambit of the invention. It is therefore to be understood that within the scope of the appended claims, the present invention may be practiced otherwise than as specifically described herein.

I claim:

1. A screw of the self-drilling and self-tapping kind for securing a first component to a second component, wherein a space encompassing a corrosive environment is defined between said first and second components, comprising;

an elongate cylindrical shank;

an enlarged head formed at one end of said shank;

a drilling tip formed at the other end of said shank;

a threaded section formed upon said shank at an axial position adjacent to said drilling tip;

a non-threaded section of said shank being interposed between said threaded section of said shank and said head;

a corrosion-resistant coating disposed upon said non-threaded section of said shank for protecting said non-threaded section of said shank from said corrosive environment disposed within said space defined between said first and second components and to which said non-threaded section of said shank is exposed when said screw is used to fasten said first component to said second component; and hole enlarging means disposed upon said shank of said screw at an axial location which is within the vicinity of the junction defined between said threaded and non-threaded sections of said shank and having a diametrical extent which is substantially equal to and just slightly greater than the diametrical extent of said non-threaded section of said shank for forming a hole within said first component which is enlarged with respect to an original hole formed within said first component by said drilling tip of said screw and which has a diameter which is substantially equal to and slightly greater than the diameter of said non-threaded section of said shank of said screw such that when said non-threaded section of said shank of said screw is passed through said enlarged hole formed within said first component, interior annular sidewall portions of said enlarged hole formed within said first component will not deleteriously affect said corrosion-resistant coating disposed upon said non-threaded section of said shank of said screw whereby said corrosion-resistant coating remains intact so as to protect said non-threaded section of said shank from said corrosive environment when said screw is used to fasten said first component to said second component and yet excessive play between said non-threaded section of said shank of said screw and said enlarged hole of said first component will not be developed.

2. A screw according to claim 1, wherein said hole-enlarging means is located within said threaded section adjacent said junction.

3. A screw according to claim 1, wherein said hole-enlarging means comprises a series of ribs which extends around the circumference of said shank, and each rib in the series extends generally in the axial direction of said shank and is spaced laterally from each of the two adjacent ribs.

4. A screw according to claim 3, wherein the length of each rib is not substantially greater than the axial length of said drilling tip.

5. A screw according to claim 1, wherein the axial spacing between said head and said hole-enlarging means is pre-determined so that when said screw operates to fasten said first component to said second component, said hole-enlarging means is positioned between opposed surfaces of said first and second components respectively and is adjacent to the said second component surface.

* * * * *